United States Patent
Sundararajan et al.

(10) Patent No.: US 10,911,330 B2
(45) Date of Patent: Feb. 2, 2021

(54) INTENT BASED APPLICATION FABRIC

(71) Applicant: Cisco Technology, Inc., San Jose, CA (US)

(72) Inventors: Balaji Sundararajan, Fremont, CA (US); Vamsidhar Valluri, Santa Clara, CA (US); Chandramouli Balasubramanian, Mountain View, CA (US); Anand Oswal, Pleasanton, CA (US); Ram Dular Singh, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/702,272

(22) Filed: Dec. 3, 2019

(65) Prior Publication Data
US 2020/0396141 A1 Dec. 17, 2020

Related U.S. Application Data

(60) Provisional application No. 62/860,577, filed on Jun. 12, 2019.

(51) Int. Cl.
*H04L 12/24* (2006.01)

(52) U.S. Cl.
CPC ...... *H04L 41/5051* (2013.01); *H04L 41/5035* (2013.01); *H04L 41/5038* (2013.01)

(58) Field of Classification Search
CPC ............. H04L 41/5051–5058; H04L 41/5032–41/5038
See application file for complete search history.

(56) References Cited

U.S. PATENT DOCUMENTS

| | | | |
|---|---|---|---|
| 2017/0237710 A1 | 8/2017 | Mayya et al. | |
| 2018/0167319 A1 | 6/2018 | Qian et al. | |
| 2018/0309664 A1* | 10/2018 | Balasubramanian | ... H04L 45/42 |
| 2019/0372853 A1* | 12/2019 | Bainbridge | ........... H04L 49/354 |

OTHER PUBLICATIONS

WAN Optimization, Accelerate Application Performance over Distance, available at https://www.silver-peak.com/solutions/wan-optimization.
DPI Engine, Detailed Traffic Visibility Up to Layer 7, available at https://www.qosmos.com/products/deep-packet-inspection-enginge/.
NBAR2 or Next Generation NBAR, available at https://www.cisco.com/c/en/us/products/collateral/ios-nx-os-software/network-based-application-recognition-nbar/qa_c67-697963.html.

(Continued)

*Primary Examiner* — Clayton R Williams
(74) *Attorney, Agent, or Firm* — Baker Botts, LLP (57) ABSTRACT

In one embodiment, a method includes providing a first profile to a plurality of edge routers of the SD-WAN, the plurality of edge routers operable to interface a plurality of devices to the SD-WAN. The first profile enables the plurality of edge routers to discover which devices of the plurality of devices support a first application. The method includes receiving, from one or more of the edge routers, information indicating which devices of the plurality of devices support the first application and building a first application fabric based on the information indicating which devices of the plurality of devices support the first application.

20 Claims, 7 Drawing Sheets

(56) References Cited

OTHER PUBLICATIONS

Michael Wood, VeloCloud, "Top Requirements on the SD-WAN Security Checklist," Network Security, vol. 2017, No. 7, Jul. 1, 2017.
PCT Notification of Transmittal of the Intl. Search Report and the Written Opinion of the Intl. Searching Authority, or the Declaration, Intl. Appln. No. PCT/US2020/037124, dated Sep. 14, 2020.

* cited by examiner

INTENT BASED APPLICATION FABRIC

PRIORITY

This application claims the benefit, under 35 U.S.C. § 119(e), of U.S. Provisional Patent Application No. 62/860,577 filed 12 Jun. 2019, which is incorporated herein by reference.

TECHNICAL FIELD

The present disclosure relates generally to a software-defined wide area network (SD-WAN), and more particularly to generating an application fabric over the SD-WAN.

BACKGROUND

A computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as software-defined local area networks (SD-LANs) and software-defined wide area networks (SD-WANs), and virtual networks, such as virtual LANs (VLANs) and virtual private networks (VPNs).

DESCRIPTION OF EXAMPLE EMBODIMENTS

Overview

Particular embodiments described herein provide an intent based application fabric which is created to control and manage one or more specific applications of interest using a portion of a software-defined wide area network (SD-WAN) in a communication network. This is accomplished by (1) discovering which devices (or routers) are running an application of interest among edge routers of the SD-WAN, and by (2) building (or generating), when one or more edge routers running the application of interest are discovered, an application fabric for the application of interest based on a policy (e.g., network policy), quality of service (QoS), latency, loss, or bandwidth availability for the application of interest. For purposes of description, certain embodiments may refer to this application fabric as an "intent based application fabric." The application fabric is to be built using a portion of the SD-WAN, because the application fabric is configured with all or part of the edge routers, each of which runs the application of interest, selected from among the edge routers of the SD-WAN.

In particular embodiments, a controller of the SD-WAN is configured to generate a first profile for a first application and provide the first profile to a plurality of edge routers of the SD-WAN. Herein, the plurality of edge routers may be operable to interface a plurality of devices to the SD-WAN, and the first profile may enable the plurality of edge routers to discover which devices of the plurality of devices support the first application. The controller is further configured to receive, from one or more of the edge routers, information indicating which devices of the plurality of devices support the first application. And the controller is furthermore configured to build a first application fabric for the first application based on the information indicating which devices of the plurality of devices support the first application.

EXAMPLE EMBODIMENTS

In some embodiments, intent-based networking infrastructure is provided to capture the business intent, in business language, and translate this intent into IT policies that can be applied and constantly monitored across the network. In view of the user's viewpoint, an intent of a user or an operator (e.g., the "what") is translated into specific executions (the "how") for performing the intent. An intent-based network provides three principal functional building blocks: capabilities to capture intent; functions to automate the deployment of the expressed intent throughout the network infrastructure; and the ability to assure that the desired intent is being realized.

In certain embodiments of this disclosure, intent-based networking (IBN) may offer a significant paradigm shift in how networks are planned, designed, and operated. In the past, tools were not available to declare intent and translate it into the device-level configurations required to realize a desired outcome. Instead, the network designer or operator had to manually derive individual network-element configurations to support the desired intent, such as, "I want these servers to be reachable from these branches; therefore, I need to configure specific virtual local area network (VLAN), subnet, and security rules on each device in my network." Intent-based networking solutions enable conventional practices that require the alignment of manually derived individual network-element configurations to be replaced by controller-led and policy-based abstractions that easily enable operators to express intent (desired outcome) and subsequently validate that the network is doing what they asked of it.

In some embodiments of intent-based networking, scale, agility and security demands associated with digital transformation require that element-by-element network configuration be replaced by automated systemwide programming of network elements with consistent intent-based policies. Furthermore, the contextual analysis of data before, during, and after deployment enables continuous verification to help assure that the network is delivering the desired outcome and protection at any point in time. Continuous gathering of telemetry and other forms of data from a multitude of diverse sources provides a rich context of information to optimize a system and ensure it is secure. Intent-based policy extends beyond the access control of clients or applications. It broadens to expressions of the desired user experience, application prioritization, service-chaining network functions that need to be applied to an application flow, or even operational service-level agreement (SLA) rules, such as, "I want to deploy only golden images on my network devices."

As described herein, embodiments include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable non-transitory media containing instructions. One or multiple systems, devices, components, etc., may comprise one or more embodiments, which may include some elements or limitations of a claim being performed by the same or different systems, devices, components, etc. A processing element may be a general processor, a task-specific processor, a core of one or more processors, or other co-located, resource-sharing implementation for performing the corresponding processing. The embodiments described hereinafter embody various aspects and configurations, with the figures illustrating example and non-limiting configurations. The term "system" or "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily denote an ordering such as one unit, operation or event occurring or coming before another or another characterization, but rather provides a mechanism to distinguish between element units. Moreover, the phrases "based on x" and "in response to x" are used to indicate a minimum set of items "x" from which something is derived or caused, wherein "x" is extensible and does not necessarily describe a complete list of items on which the operation is performed, etc. The term "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Additionally, the transitional term "comprising," which depending on the context may generally be synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Figure 1:
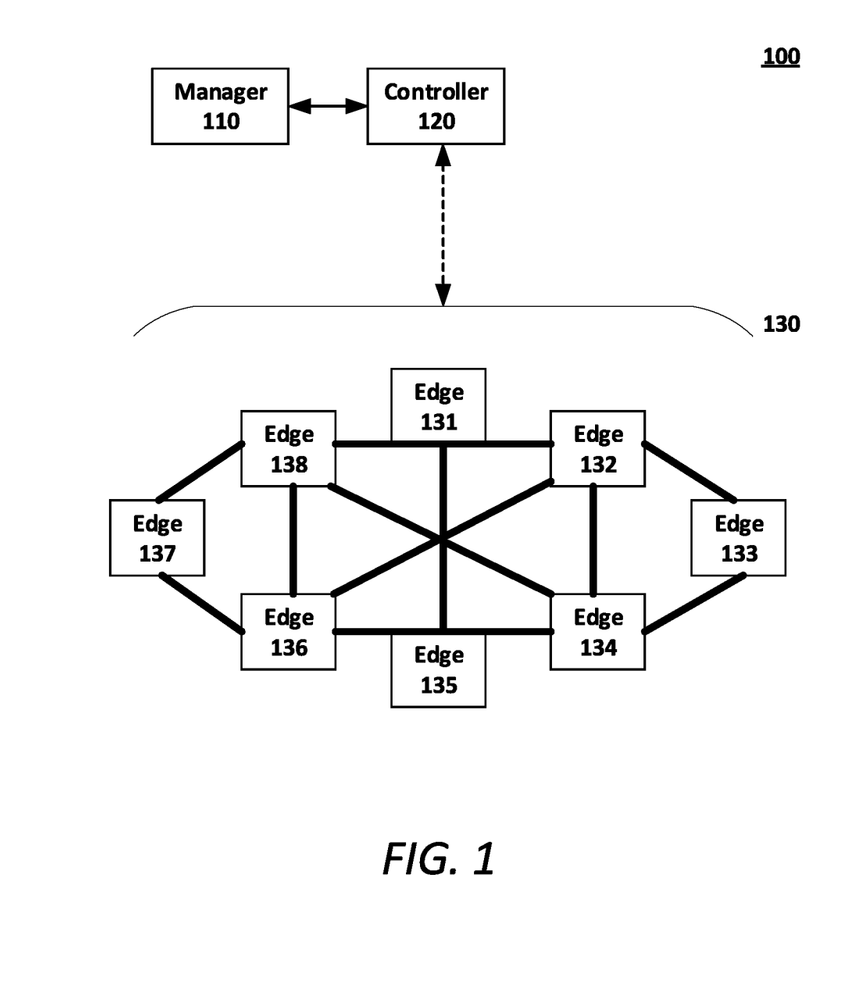
FIG. 1 illustrates an example of SD-WAN overlay.

FIG. 1 illustrates an example of an SD-WAN overlay 100. SD-WAN overlay 100 comprises a management controller (manager 110), a network controller (controller 120), and a plurality of edge routers 130 (e.g., edge routers 131 to 138). Edge routers 130 connect with one another via, for example, dynamic tunnels. The example in FIG. 1 illustrates a fully-meshed network in which each edge router 130 is part of the SD-WAN overlay. Edge routers 130 may interface a plurality of devices to the SD-WAN. Examples of devices may include washing machines, credit card machines, security cameras, conference room cameras, printers, remote surgery machines, etc. The devices may be deployed at different sites. For example, devices at one site may communicate with edge router 131, and devices at a different site may communicate with edge router 132. Examples of different sites may include a headquarters, one or more branch offices, an R&D campus, a cloud-based site, a data center, etc. The devices may communicate messages via the SD-WAN according to various applications (e.g., washing machine application, video conferencing, credit card application, security camera application, printer application, remote surgery application, etc.).

Manager 110 and controller 120 are both examples of controllers. In the example shown in FIG. 1, manager 110 (e.g., a management controller) is connected with controller 120. Controller 120 is configured to communicate with manager 110 and to control a plurality of edge routers 130 in SD-WAN overlay 100. In one embodiment, controller 120 may be embodied independently from manager 110. In another embodiment, controller 120 may embodied together with manager 110 (e.g., a controller in a single computer system or device may perform functionality of both manager 110 and controller 120). Thus, depending on the embodiment, a controller may comprise manager 110, controller 120, or both (whether embodied in the same system/device, or embodied in different systems/devices communicatively coupled via a network or other connection).

In certain embodiments, manager 110 and controller 120 may cooperate to determine an application-specific fabric overlay for edge routers deployed in the SD-WAN overlay. The application-specific fabric comprises a portion of the SD-WAN operable to communicate messages associated with a specific application (as one example, a washing machine application). The application-specific fabric includes a subset of edge routers 130 that interface devices that support the specific application (in the example, the washing machine application) with the SD-WAN. In some embodiments, manager 110 and controller 120 may build the application-specific fabric overlay in response to a request from a user (such as a system administrator, network operator, or end user). The request may indicate the application (or features of the application) for which the user would like to build an application-specific fabric.

As an example, in certain embodiments, manager 110 is operable to determine an application of interest (an application for which an application fabric overlay is to be built)

and to provide controller 120 with a profile to be distributed to edge routers 131-138. The profile enables edge routers 131-138 to discover which devices support the application of interest. One or more of edge routers 131-138 may each provide information to controller 120 indicating whether that edge router has discovered any devices supporting the application of interest. Controller 120 provides the information to manager 110, and manager 110 uses the information to build the application fabric overlay for the application of interest. Manager 110 may then develop application-specific policies and provide the policies to controller 120 for distribution to the subset of edge devices that are associated with the application fabric overlay for the application of interest. The subset of edge devices may then enforce the application-specific policies when communicating traffic associated with the application of interest. Controller 120 may receive application monitoring data (or application meta data) from the end devices.

In certain embodiments of this disclosure, an example method and system may support the capabilities of SD-WAN and may provide an intent based application fabric (e.g., a platform using a set of middleware technologies) for business critical applications in the SD-WAN. For example, in certain embodiments, one or more controllers of the SD-WAN infrastructure (e.g., manager 110 and/or controller 120) may be operable to: see or monitor an application fabric (e.g., a customer's application fabric); monitor traffic states in sites (e.g., places where edge routers 130 are placed in FIG. 1) and traffic flowing in the network; monitor in real time the security and performance of the traffic across different sites; and/or enforce traffic policies for segmenting the network, providing security (e.g., quarantine or other security), and/or changing or maintaining quality of service (QoS). Particular embodiments of this disclosure provide a solution and a system for performing an intent based application fabric in the SD-WAN that performs a set of technical functions or abilities: (i) to identify applications hosted in a site; (ii) to host the applications and collect meta data on an Enterprise Network Compute System (ENCS)-type branch platform and to advertise application availability to the rest of the enterprise networks; (iii) to visualize and monitor flows/conversations belonging to an application across the enterprise; (iv) to query a management controller (e.g., vManage Controller such as manager 110 in FIG. 1) for network bandwidth availability for using SD-WAN overlay and allocate dynamic tunnels between sites for facilitating an application.

Figure 2:
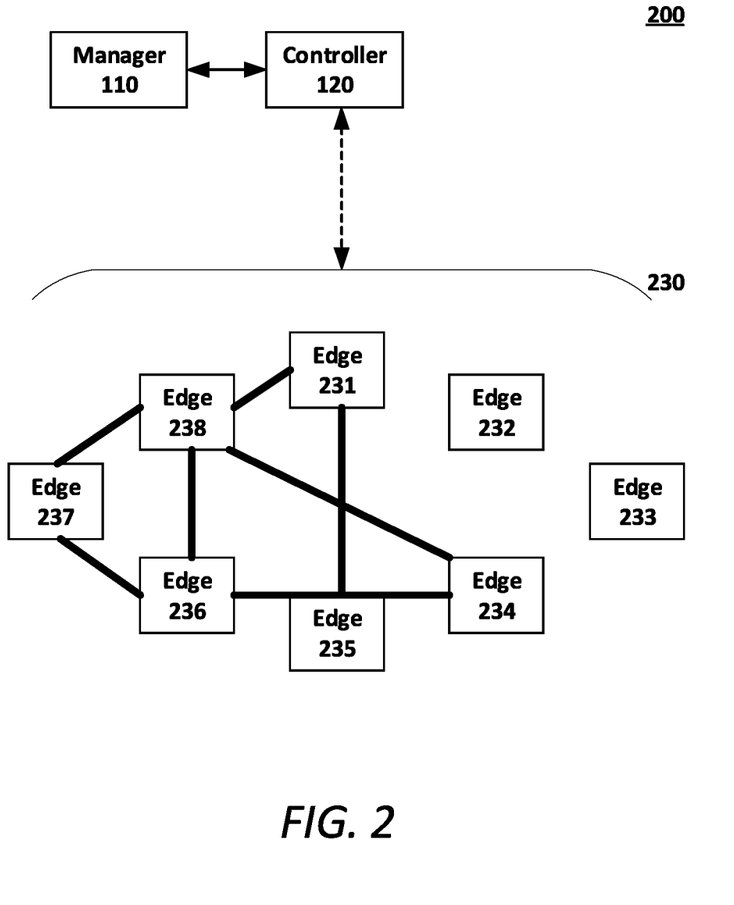
FIG. 2 illustrates a first example of an application overlay for a first application fabric in SD-WAN.

FIG. 2 illustrates a first example of an application overlay for a first application fabric in SD-WAN. FIG. 2 includes manager 110 and controller 120 (described above with respect to FIG. 1). FIG. 2 also includes a plurality of edge routers 230 (similar to edge routers 130 described above with respect to FIG. 1). In particular, FIG. 2 illustrates eight edge routers 231-238. As indicated by the tunnels shown in FIG. 2, the application overlay connects a subset of the edge routers (231 and 234-238). This subset represents the edge routers associated with a specific application. In the example, edge routers 232 and 233 are not associated with the specific application (e.g., the devices that edge routers 232 and 233 interface to the SD-WAN do not support the specific application) and therefore edge routers 232 and 233 are not included in the application overlay. Thus, application overlay shown in FIG. 2 does not include tunnels connecting to edge routers 232 and 233.

As an example, FIG. 2 may represent an application overlay for an application related to a health care. In certain embodiments, an application overlay may encompass applications associated with a field (e.g., health care) and/or an enterprise (e.g., a hospital or health care provider). As an example, an intent based application fabric may be applied to a health care vertical (e.g., McKesson, Cigna, Palo Alto Medical Foundation and others) use case in which hospitals are located at various sites and these various sites are connected using SD-WAN overlay. Certain health care-related embodiments may facilitate providing patients with high quality care and access to all of the latest technologies available to the doctors and staffs. Particular embodiments may provide availability of various pre-determined application overlays based on business vertical like, e.g., the heath care. In an embodiment, to identify applications which are managed in devices of the SD-WAN, a computing system may deploy, for example, device classification services (DCS) which classify the devices in addition to application recognition engines (e.g., NBAR2) which use application signatures.

Consider the example of an application for "remote surgery" telepresence. Particular embodiments enable or authorize the health care provider to perform a set of instructions in the network. The instructions may indicate the user's intent and may be based on information obtained from the user. A user-friendly interface may be provided to obtain the user's intent through familiar, natural language ordinarily used in the applicable business, such as the health care business, instead of requiring the user to learn technical jargon to convey the user's intent. The instructions may allow the health care provider to know (i.e., monitor, detect, or check) all the sites where the remote surgery application can be performed. In the example, the health care provider may be associated with a subset of the sites (e.g., hospitals) at network end points. The particular embodiments may enable or authorize the health care provider to show, between these sites, a view of how the "remote surgery" telepresence applications are performing, where each remote surgery application is hosted (e.g., which of the edge routers are hosting, scheduled to host, and/or capable of hosting the remote surgery application), and the performance reliability and/or performance guarantee associated with each remote surgery application (or each edge router). The health care provider may use information obtained based on the application overlay to reserve bandwidth resources. For example, the health care provider may reserve bandwidth for a particular time (when the surgery is scheduled) with a particular quality of service (QoS) guarantee (QoS approved for the remote surgery application). The health care provider can schedule the resources to ensure that the reserved resources have high availability (e.g., a remote surgery application may require high availability to ensure patient safety and may be given higher priority/QoS guarantee compared to other types of applications, such as back office applications). Information obtained via the application overlay may also aide the health care provider in quickly troubleshooting any problems in the network or with a particular application.

As another example, certain embodiments may provide video and voice services in an enterprise network such that the SD-WAN controller (e.g., 110 and 120 in FIGS. 1 and 2) is to perform various query processes and the bandwidth between sites is reserved to participate in the video and/or voice teleconference meetings. Manager 110 may determine a policy (or policies) that is specific to the application of interest. Manager 110 may provide the determined policy to the edge routers via the controller 120. Different types of policies may include, for example, routing policies, bandwidth reservation policies, QoS policies, service level agreement (SLA) policies, security policies, etc. The policy may be determined based on information obtained from the user (such as a system administrator, network operator, or end user). The policy may also be determined based on information obtained from the network (e.g., based on network performance).

Figure 3:
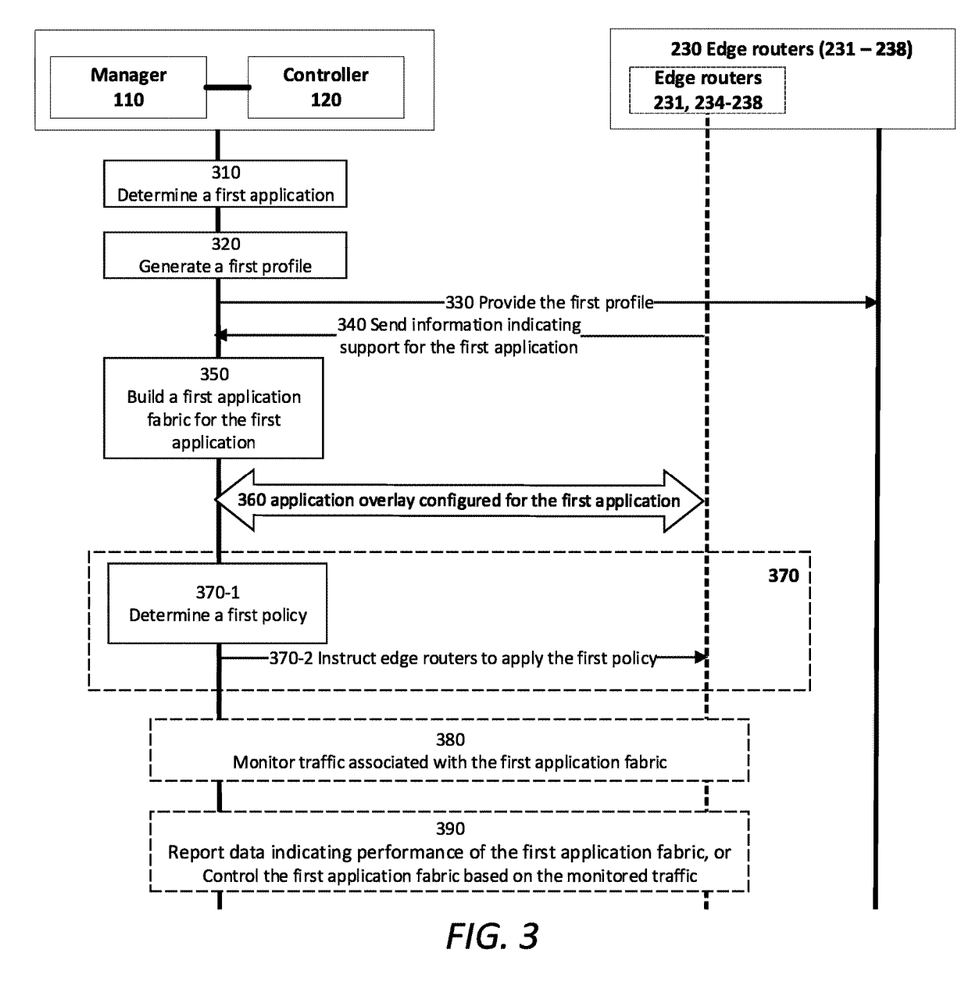
FIG. 3 illustrate an example signal flow of a method and system for building a first application fabric.

FIG. 3 illustrate an example signal flow of a method and system for building a first application fabric. In certain embodiments of this disclosure, a method and system for building an "intent based application fabric" (e.g., application fabric overlay shown in FIG. 2) for a business critical application (e.g., "remote surgery" application) may perform the following processes (or steps): (1) application discovery; (2) application fabric building; (3) application monitoring; (4) application control and experience. An embodiment in FIG. 3 presents signal flows associated with the processes of the application discovery (e.g., steps 310-350), application fabric building (e.g., step 360), application monitoring (e.g., step 380), and application control and experience (e.g., step 390). The example in FIG. 3 shows certain functionality of one or more controllers. This functionality may be performed by manager 110, controller 120, both, or any other controller or combination of controllers operable to perform the described functionality, depending on the embodiment.

At step 310, manager 110 may determine a first application. The first application may be an application for which a first application fabric is to be built. For example, the first application may be an application of interest to a user. In certain embodiments, the first application may be determined based on information received from a user (such as a system administrator, network operator, or end user). In certain embodiments, the user may select the first application from a list of predetermined applications. For example, the list might include a video application, a telepresence application, a printer application, a credit card reader application, etc. In certain embodiments, the user can define a custom application. For example, a washing machine vendor may provide characteristics for discovering washing machines that support a proprietary washing machine application. Examples of characteristics may include an application identifier, an application signature, or other application-related information (e.g., a parameter, a port number, a protocol number, a protocol format, a message signature, etc.). The application signature (or custom signature) is configured to determine a certain application which is specific to a certain business or a specified customer. Certain embodiments may provide the user with the option of selecting from a list of predetermined applications (e.g., listing default applications or previously defined custom applications) or customizing a new definition for an application. Information may be obtained from a user in any suitable manner, such as via an I/O interface of manager 110 (or controller 120), or via a network (e.g., the Internet) that connects manager 110 to a computer system of the user.

At step 320, manager 110 may generate a first profile for enabling edge routers 231-238 to discover devices that support the first application (i.e., the application determined in step 310). The profile may indicate one or more characteristics associated with the first application, such as an application identifier, an application signature, or other application-related information (e.g., a parameter, a port number, a protocol number, a protocol format, a message signature, etc.). Manager 110 may provide the first profile to controller 120 for distribution to edge routers 230 of the SD-WAN, and at step 330 controller 120 may provide the first profile generated in step 320 to the plurality of edge routers 230 of the SD-WAN.

The first profile enables edge routers 231-238 to discover devices that support the first application. For example, edge routers 231-238 are operable to interface a plurality of devices (such as washing machines, credit card machines, security cameras, conference room cameras, printers, etc.) to the SD-WAN. Suppose the first profile indicates characteristics of a video conferencing application, such as a message signature of messages that a video conferencing device communicates to other video conferencing devices via an edge router and SD-WAN. The first profile enables the plurality of edge routers 231-238 to discover which devices of the plurality of devices support the first application. Continuing with the video conferencing application example, the message signature can be compared to messages that end devices send to the SD-WAN, and messages from video conferencing devices running the first application would match the message signature associated with the first application. Messages from other types of devices (such as washing machines) would not match the message signature associated with the first application.

At step 340, manager 110 and/or controller 120 may receive, from one or more of the edge routers (e.g., 231, 234-238) among edge routers 230, information indicating which devices of the plurality of devices support the first application. In some embodiments, manager 110 receives the information from the edge routers via controller 120. In FIG. 3, edge routers 231, and 234-238 may send information which indicates support for the first application. The information may be transmitted through traffic signals sent from one or more edge routers. In some embodiments, the information may include a device signature (or other device identifier) used for validating each device. Manager 110 may perform a validation process (or security process) based on the device signature. For example, if the first application of interest is a video conferencing application, traffic signals received from a printer (via one of the edge routers) would contain the device signature of a printer and would fail validation for the video conferencing application. Thus, the printer would not be authorized to run the video conferencing application. This prevents rogue devices, such as devices that are spoofing an application, from being associated with the first application fabric. Validation may be performed by any suitable node (e.g., manager 110, controller 120, or an edge router).

At step 350, manager 110 and/or controller 120 may build the first application fabric based on the information indicating which devices of the plurality of devices support the first application. The first application fabric may correspond to a portion of the SD-WAN operable to communicate messages associated with the first application. For example, FIG. 1 shows a full-meshed SD-WAN overlay operable communicate between edge routers 131-138, and FIG. 2 shows the first application fabric (i.e., an application overlay configured for the first application) to be built with a portion (e.g., edge routers 231 and 234-238) determined among all edge routers 231-238 of the SD-WAN overlay. Since building the first application fabric between edge routers 231 and 234-238 configures the application overlay for the first application, edge routers 231 and 234-238 may be operable to communicate messages associated with the first application therebetween (at step 360). In the example, manager 350 excludes edge routers 232 and 233 from the first application fabric based on the absence of any message from edge routers 232 and 233 in step 340 (or based on the presence of a message from edge routers 232 and 233 indicating that they have not discovered any devices that support the first application). In certain embodiments, manager 110 and/or controller 120 may continue to receive information from edge routers 230 over time indicating discovery of additional devices that support the first application (e.g., as additional devices are added to the SD-WAN over time). Manager 110 and/or controller 120 may continue to build/update the first application fabric accordingly. Similarly, manager 110 and/or controller 120 may build/update the first application fabric to remove an edge router from the first application fabric (e.g., if all of the devices that the edge router had discovered for the first application are later removed from the site hosted by that edge router). Thus, building of an application fabric may be dynamic to reflect when devices are added to or removed from the SD-WAN.

At step 360, manager 110 and/or controller 120 configure the first application fabric comprising edge devices 231 and 234-238 (and excluding edge devices 232 and 233). In certain embodiments, manager 110 and controller 120 may use the first application fabric to apply application-specific policies, as shown in step 370. At step 370-1, manager 110 may determine a first policy that is specific to the first application and may provide the first policy to controller 120. At step 370-2, controller 120 may push the first policy with signatures (or identifiers, or meta data) for the first application of interest to edge routers 231 and 234-238 that are associated with the first application fabric to apply the first policy to traffic of the first application. That is, manager 110 and controller 120 instruct each of edge routers 231 and 234-238 to apply the first policy to traffic of the first application (at step 370-2). The first policy may include one or more different types of policies such as, for example, routing policies, bandwidth reservation policies, QoS policies, SLA policies, security policies, etc. The first policy may be determined based on information obtained from the user (such as a system administrator, network operator, or end user). The policy may be also determined based on information obtained from the network (e.g., based on network performance). In one embodiment, controller 120 may abstain from providing the first policy to edge routers that are not associated with the first application fabric. Thus, the first policy need only be applied by the edge routers (e.g., 231 and 234-238 in FIG. 2) that are associated with the first application fabric. Also, depending on the type of policy, the first policy may be provided to and enforced by other types of nodes (e.g., internal routers) associated with the first application fabric. In an alternative embodiment, step 370 may be performed before building the first application fabric (in which case the policy may be sent to each edge router in the SD-WAN).

Either or both of manager 110 or controller 120 may further perform the processes of application monitoring and application control at steps 380 and 390. Manager 110 may monitor traffic associated with the first application fabric. For example, manager 110 may receive information about application-specific traffic communicated via the SD-WAN. Manager 110 may receive the information about the application-specific traffic from the edge routers associated with the first application fabric (at step 380). In some embodiments, manager 110 may receive the information from the edge routers via controller 120. Manager 110 may generate data (e.g., the data can be statistics, a status report, etc.) indicating performance of the first application fabric and report the generated data to a user (such as a system administrator, network operator, or end user) or to components of the network that use the data to automatically update policies (e.g., a routing policy could be updated if the data shows that the first application was experiencing too much latency) (at step 390). At step 390, manager 110 and controller 120 may further control the first application fabric based on the monitored traffic, by instructing one or more nodes (e.g., edge routers 231, 234-238 in FIG. 2 and/or internal nodes within the SD-WAN (not shown)) of the first application fabric to perform one or more actions such as, for example, reserving a bandwidth resource, implementing a routing decision, and updating a policy.

The method described in FIG. 3 may be repeated to build additional application fabrics for additional applications. Different application fabrics may include different (overlapping or non-overlapping) portions of the SD-WAN depending on where the devices supporting the various applications are located. Examples are described with respect to FIGS. 4-5.

Figure 4:
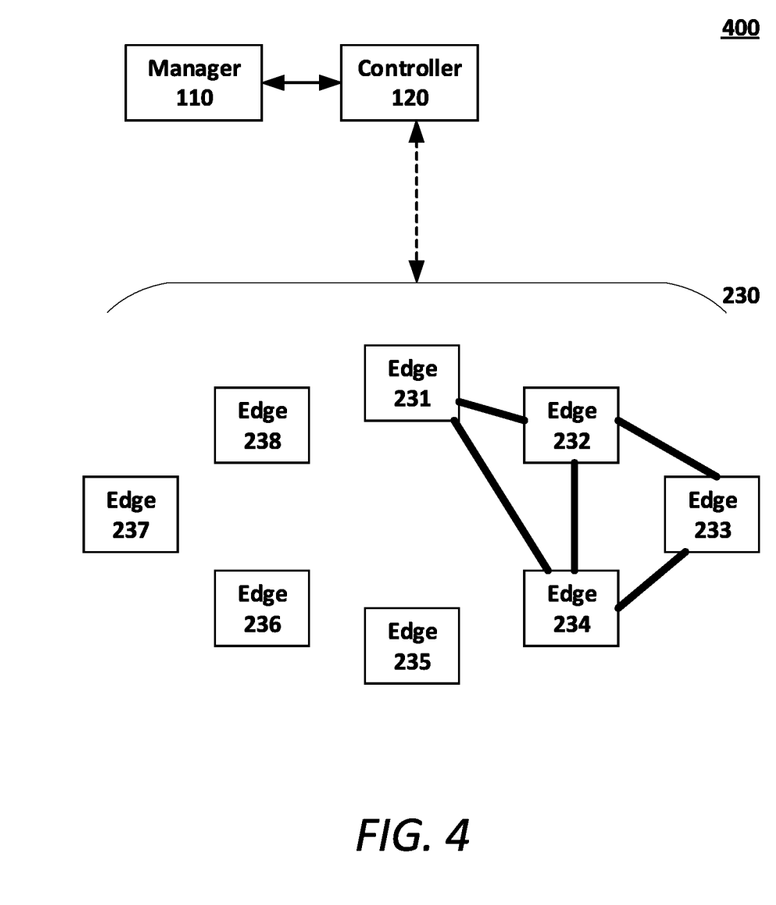
FIG. 4 illustrates a second example of an application overlay for a second application fabric in SD-WAN.

FIG. 4 illustrates a second example of an application overlay for a second application fabric in SD-WAN. A topology illustrated in FIG. 4 may be an application overlay for a specific application of interest (e.g., "washing machine" application). Referring to FIG. 4, the second application fabric for the second application of interest is built to configure application overlay 400 in the SD-WAN. In FIG. 4, the second application fabric 400 is configured with edge routers (e.g., edge routers 231-234 in FIG. 4) operable to run the specific application (i.e., "washing machine" application). The second application fabric 400 of FIG. 4 corresponds to a portion of the SD-WAN, as described above in FIG. 3. Referring to FIGS. 2 and 4, FIG. 2 shows the application overlay of the first application fabric which is built for the first application and operable to communicate between edge routers 231 and 234-238. FIG. 4 shows the application overlay of the second application fabric which is built for the second application and operable to communicate between edge routers 231-234.

Figure 5:
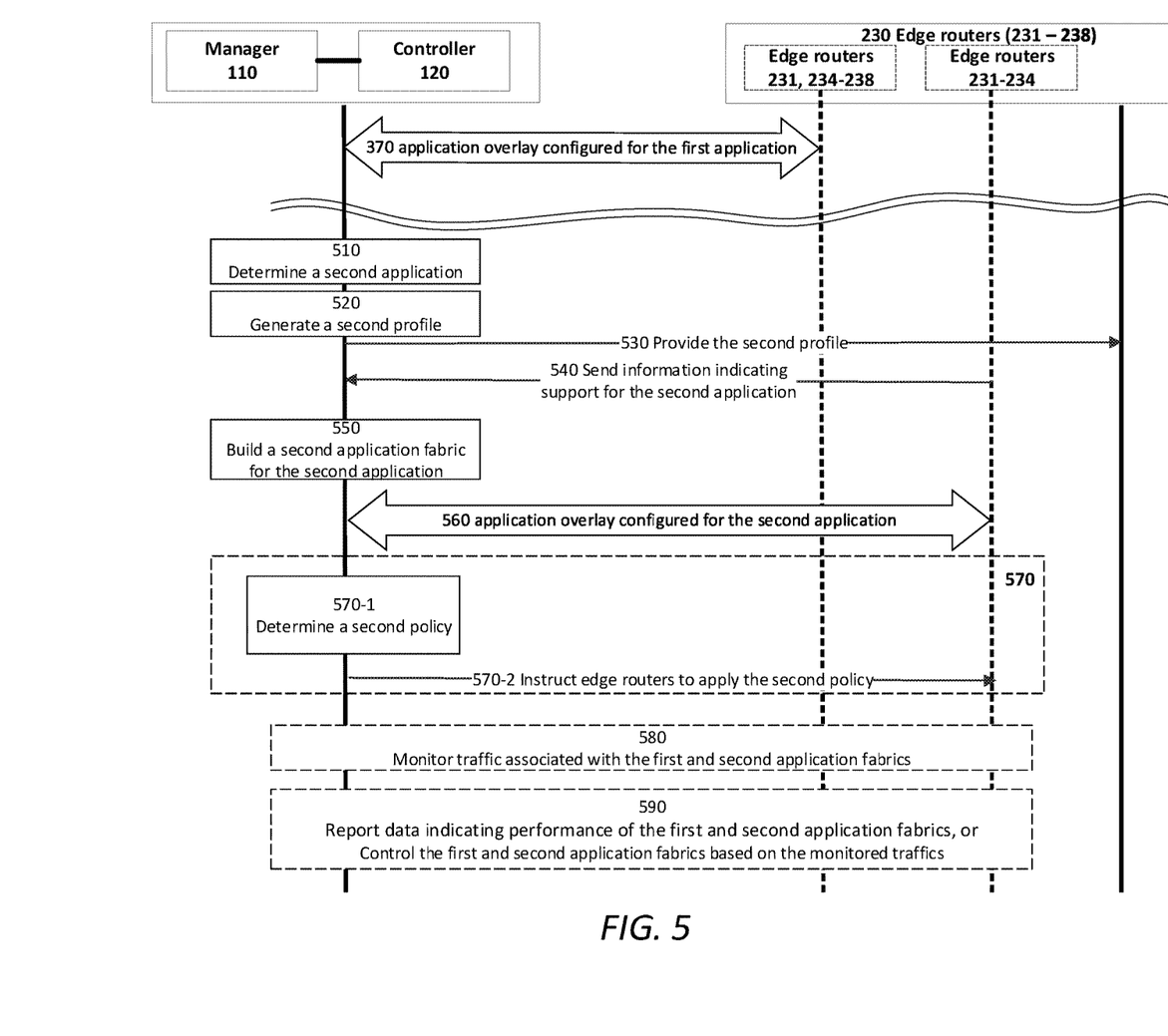
FIG. 5 illustrate an example signal flow of a method and system for building a second application fabric.

FIG. 5 illustrates an example signal flow of a method and system for building a second application fabric. The processes for building the second application fabric are analogous to the processes described in FIG. 3. While the first application fabric configured with edge routers 231 and 234-238 has been built (step 370), the second application fabric may be further built for the second application.

Step 510 determines a second application. The second application may be determined in a manner analogous to step 310 of FIG. 3. As an example, the method may build a first application fabric for a first application (e.g., a video conferencing application) following the steps of FIG. 3 and may also determine a second application (e.g., a printer application) for which a second application fabric is to be built.

Step 520 generates a second profile for enabling edge routers 231-238 to discover devices that support the second application (i.e., the application determined in step 510). The profile may indicate one or more characteristics associated with the second application, such as an application identifier, an application signature, or other application-related information (e.g., a parameter, a port number, a protocol number, a protocol format, a message signature, etc.). Manager 110 may provide the second profile to controller 120 for distribution to edge routers 230 of the SD-WAN, and at step 530 controller 120 may provide the second profile generated in step 520 to the plurality of edge routers 230 of the SD-WAN.

Step 540 of FIG. 5 is generally analogous to step 340 of FIG. 3. In step 540, manager 110 and/or controller 120 may receive, from one or more of the edge routers (e.g., 231-234) among edge routers 230, information indicating which devices of the plurality of devices support the second application. In the example, the subset of edge routers that support the second application (edge routers 231-234) differs from the subset of routers that support the first application (edge routers 231, 234-238), however, the different subsets partially overlap (edge routers 231 and 234 belong to both subsets).

Step 550 builds the second application fabric for the second application. Step 550 in FIG. 5 is generally analogous to step 350 in FIG. 3. The second application fabric comprises the edge routers from which devices supporting the second application were discovered in step 540 (e.g., edge routers 231-234) and excludes the other edge routers (e.g., edge routers 235-238).

Step 560 configures the second application fabric for the second application. Step 560 in FIG. 5 is generally analogous to step 360 in FIG. 3. In certain embodiments, manager 110 and/or controller 120 may use the second application fabric to apply application-specific policies, as shown in step 570. As an example, at step 570-1, manager 110 may determine a second policy that is specific to the second application and may provide the second policy to controller 120. At step 570-2, controller 120 may push the second policy to edge routers of the second application fabric (e.g., edge routers 231-234). The edge routers of the second application fabric may then apply the second policy to traffic associated with the second application. As discussed above, examples of policies may include routing policies, bandwidth reservation policies, QoS policies, SLA policies, security policies, etc. In certain embodiments, policies may allow for prioritizing certain applications. For example, suppose that the first application fabric corresponds to a critical application (such as a remote surgery telepresence application) and the second application fabric corresponds to a non-critical application (such as a printer application in the back office). The policies may be configured to ensure that the first application fabric has higher priority for bandwidth reservation, with stricter QoS and SLA policies, etc.

Step 580 of FIG. 5 monitors traffic associated with the first application fabric and traffic associated with the second application fabric (similar to step 380 of FIG. 3). Step 590 of FIG. 5 may report data indicating performance of the first application fabric and data indicating performance of the second application fabric (similar to step 390 of FIG. 3). In certain embodiments, statistics or reports based on the monitoring the first application traffic may be separated from statistics or reports based on monitoring the second application fabric. In certain embodiments, the statistics or reports may be combined and application fabric identifiers may be included with the data to allow for filtering information associated with either the first application fabric or the second application fabric. In certain embodiments, step 590 comprises controlling the first application fabric and the second application fabric based on the monitored traffic (similar to step 390 of FIG. 3). The first application fabric and the second application fabric may be controlled separately based on their respective traffic. As an example, a routing policy for the first application fabric could be updated if the data shows that the first application was experiencing too much latency, but a routing policy for the second application fabric would not necessarily need to be updated if the data shows that the second application was experiencing acceptable latency. Steps 580 and 590 may be performed by manager 110 and/or controller 120.

Figure 6:
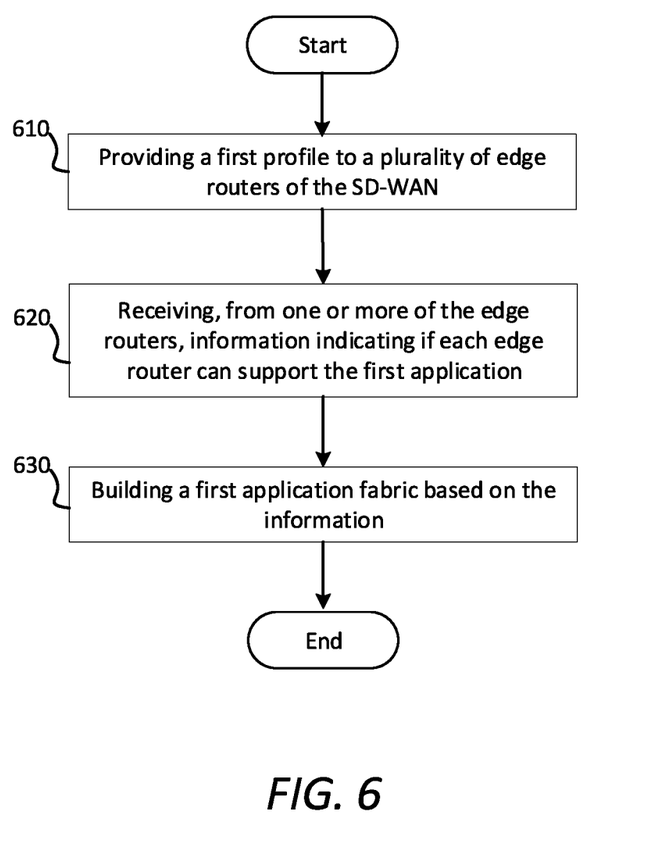
FIG. 6 illustrates an example of a flow chart of building an application fabric for an application of interest in the SD-WAN.

FIG. 6 illustrates an example of a flow chart of building an application fabric for an application of interest in SD-WAN. Referring to FIGS. 2-6, the method may be performed by a controller (e.g., the controller may be either or both of manager 110 and controller 120 in FIGS. 2-5) of the SD-WAN, where the controller is included in a computing system and configured to perform processes for building the application fabric for a specific application of interest. In one embodiment, the controller is configured to provide a first profile to a plurality of edge routers of the SD-WAN (at step 610). The edge routers are operable to interface a plurality of devices to the SD-WAN, and the first profile may enable the plurality of edge routers to discover which devices of the plurality of devices support a first application. At step 620, the controller is configured to receive, from one or more of the edge routers, information indicating which devices of the plurality of devices support the first application. At step 630, the controller is configured to build a first application fabric based on the information indicating which devices of the plurality of devices support the first application, where the first application fabric corresponds to a portion of the SD-WAN operable to communicate messages associated with the first application.

In certain embodiments, descriptions and requirements related to building an intent based application fabric are presented hereinafter in view of the following processes (or steps): (1) application discovery; (2) application fabric building; (3) application monitoring; (4) application control and experience.

Step1: Application Discovery

The Application discovery according to certain embodiments of this disclosure is to perform technical instruction(s) to identify the sites (e.g., endpoints or edge routers in FIGS. 1 and 2) where business critical applications are hosted and track the user conversations/sessions between the sites and build an application fabric (e.g., intent based application fabric) based on this information with real time monitoring view. The certain embodiments enable one or more applications that need the application fabric to execute technical functions, instructions or capabilities, as follows:

a) the applications can be automatically selected based on the industry/vertical or Use case;
   b) the applications can be statically defined by customer like {Protocol, Ports};
   c) the applications can be selected from a pre-defined list;
   d) the applications can be selecting a special "fabric option" when App is installed on ENCS platform in a branch (or edge router).

Once the applications (e.g., the specific application of "Remote Surgery" presented in the descriptions related to FIG. 2) are selected, this information is propagated by a management controller (e.g., Manager 110 shown in FIGS. 1 and 2) of SD-WAN to all sites or the specific sites as desired by a customer. Specific sites are relevant when the customer is interested in optimizing say Webex only in selected sites.

Edge devices will make use of existing Application identification module (NBAR2, Cosmos) to observe the traffic and match against the applications selected in Fabric list. If there is a match, application metadata is collected at the site and is advertised in the smart controller (e.g., Controllers/vSmart) which include {Site, flow information—src, dst, tunnel, time, volume, performance}. Application signatures may be deployed on many edge devices, where some edge devices may not be part of an application fabric yet because of no application traffic seen on that edge device or administrator may not have excluded through some policy.

ENCS Branch case: When the customer installs an Application at different sites, on the virtual platform with Application Fabric option selected in vManage, Fabric policy is pushed and using NBAR2/SD-AVC applications metadata is advertised from the sites where the app is hosted.

Step2: Application Fabric Building

Application metadata will be advertised via OMP (Overlay Management Protocol) protocol as a protocol extension, there by Controllers like vSmart can build Application overlay across sites for the said application. Each Application which is hosted at sites will have separate overlay fabric and needs its own bandwidth and QoS. These App requirements are pre-configured on vManage so all sites hosting this application will be aware of Application fabric needs.

When Auto Application discovery is selected, Applications belonging to certain Category may be grouped like "Corporate Communication Applications" which may include say WebEx, Skype, Zoom etc. and Fabric will also have individual App Fabric view also i.e., show me only WebEx Fabric. If needed Application can build Dynamic Tunnels between the sites for the said Applications. Once the Application Fabric is built by the Controllers, Application fabric specific Policies like "Reserve BW for this applications across sites say 1,2,3 from time say 10:00 am to 12:00 pm tomorrow" can be pushed with ease.

Step3: Application Monitoring

Constant vAnalytics (i.e., a leading analytics application for video collaboration) monitoring would indicate if Applications topology on the overlay has the minimum requirement met in the Fabric Overlay. If the requirement is not met, the performance of application across the sites will be sub-optimal and necessary recovery actions like Application priority and BW reservations should be provided. Once a case where application packet drops are witnessed takes place, in such a case more bandwidth on the IPSEC tunnels between sites along the path for that Application(s) is allowed to be reserved or assigned.

Monitoring of Application is done depending on whether to satisfy App fabric SLA. Newer Application that needs to be hosted across sites, will first consult the SD-WAN controller and determine if there is enough bandwidth available on SD-WAN overlay to satisfy the application requirements. Monitoring of Application that a customer is interested in may happen at non-application fabric edge devices for purpose of visibility.

Step4: Application Control and Experience

The exemplary method and system are to perform the technical functions or instruction related to Application Experience, as follows:

(i) For the "Remote Surgery" Application, there is a need to provide reliable video and voice services in the network with real time QoS guarantees such that for the duration of the surgery there are no interruptions. To achieve this, there should be an ability to reserve bandwidth and provide enterprise grade QoS for the specific application transactions for the duration and provide great Application Response Times. This can be also achieved in certain cases by de-prioritizing the other traffic for the duration of the said Application transaction/conversation/session when there is contention for the BW resources. (ii) On Demand Bandwidth reservation across application fabric based on type of Application traffic will be very compelling to the Customers (Transactional/Bulk/Real Time/Conversational).

Application experience is performed by the exemplary method and system, and can be achieved at a granular level in certain cases. For examples, a video conferencing is used by many user groups but based on the Application Fabric monitoring, if a specific group of users need to be prioritized then "SGT" based Policies can be authored for the Application Fabric. For example: "Video conferencing sessions for the Doctors/Surgery rooms" is of higher priority than others video conferences for staff meetings.

The exemplary method and system are to also perform the technical functions or instruction related to Application Control, as follows:

(i) Ability to push Application updates to all the relevant sites might be bandwidth intensive operation, identifying Bandwidth availability to fulfill the intent (s/w Delivery, Apps Delivery etc.), would mean, SDWAN controller will create tunnels with reserved bandwidth for the said operation, this can be done on-demand or scheduled based on the Application monitoring data collected over the Application Fabric. Other updates include Virus Scanning software upgrade, Microsoft office upgrades, backup/restore software updates.

(ii) Policies can be authored in the vManage (e.g., manager 110 in FIG. 2) and propagated via vSmart (e.g., controller 120 in FIG. 2) to the relevant sites. These policies will have the capability to reserve the BW and QoS resources on the SD-WAN overlay for the duration needed.

In some embodiments, a computing system comprises one or more end devices (or branch devices, or edge routers) configured to define one or more applications based on a user preference, provide a pre-defined list including the one or more application, select a specific application from the pre-defined list, and enable the specific application to select one or more fabric options. The computing system further comprises a first controller configured to propagate information for selecting the specific application to one or more specific sites. The computing system further comprises a second controller configured to build an application overlay for the specific application across the specific sites and advertise a metadata of the specific application to the one or more branch devices. The computing system further comprises one or more edge devices configured to observe a traffic, the traffic against the application selected in a fabric list, and collect metadata of the specific application. The computing system executes one or more processes including a first process for performing an application discovery to identify one or more endpoints and track sessions established between the endpoints, a second process for performing an application fabric building based on information on the identified endpoints and the tracked sessions, a third process for performing an application monitoring based on predetermined requirements for a fabric overlay in a soft defined network system, and a fourth process for performing application control and experience by determining a degree for quality of service (QoS) and reserving a demand bandwidth based on type of application traffic.

Figure 7:
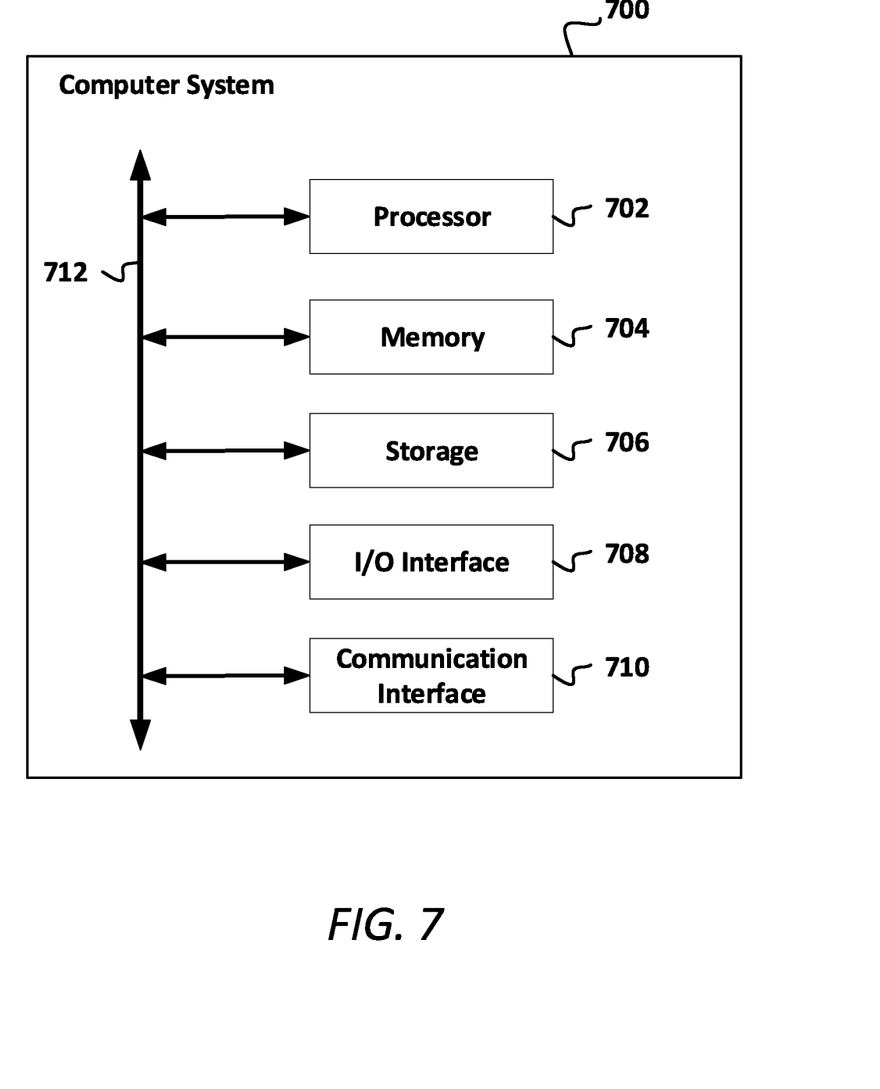
FIG. 7 illustrates an example of components of computer system, such as a manager, a controller, or an edge router.

FIG. 7 illustrates an example of components of computing system 700, in accordance with certain embodiments. In particular embodiments, computing system 700 may be implemented as manager 110, a controller 120, an edge router (e.g., 131-138 or 231-238), an end device, or other suitable computing system for performing functionality disclosed herein. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example, and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes one or more processor(s) 702, memory 704, storage 706, input/output (I/O) interface(s) 708, communication interface(s) 710, and/or bus (or busses) 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example, and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example, and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example, and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example, and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. In particular embodiments, communication interface 710 may facilitate communication between computer system 700 and manager 110, controller 120, edge router (e.g., 131-138 or 231-238), or an end device. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example, and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Certain embodiments of the present disclosure may provide one or more technical advantages. A technical advantage of certain embodiments allows for building different application fabric overlays for different applications depending on which portions of the SD-WAN support a particular application. For example, a first application fabric overlay (such as that shown in FIG. 1) may be used for a first application, a second application fabric overlay (such as that shown in FIG. 2) may be used for a second application, a third application fabric overlay (such as that shown in FIG. 4) may be used for a third application, and so on for any suitable number of applications. Each application fabric overlay is topology independent, and an overlay need not touch all sites. As an example, in an embodiment, the first application may correspond to a surveillance application such that video cameras connected for surveillance of a campus become part of the first application fabric overlay, the second application may correspond to a healthcare application such that HIPAA-Compliant devices become part of the second application fabric overlay, and the third application may correspond to a real-time collaboration application such that real-time collaboration software becomes its own (third) application fabric overlay. Other embodiments may build application fabric overlays for additional applications or different applications. Certain embodiments may include all, some, or none of these advantages. Other technical advantages will be appreciated by those of ordinary skill in the art.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for use by a controller of a software-defined wide area network (SD-WAN), the method comprising:
   providing a first profile to a plurality of edge routers of the SD-WAN that interface a plurality of devices to the SD-WAN, wherein the first profile enables the plurality of edge routers to discover which devices of the plurality of devices support a first application;
   receiving, from one or more of the edge routers, information indicating which devices of the plurality of devices support the first application; and
   building a first application fabric based on the information indicating which devices of the plurality of devices support the first application, wherein the first application fabric corresponds to a portion of the SD-WAN operable to communicate messages associated with the first application.

2. The method of claim 1, further comprising:
   determining a first policy that is specific to the first application; and
   instructing each of the edge routers that is associated with the first application fabric to apply the first policy to traffic of the first application.

3. The method of claim 1, further comprising:
   monitoring traffic associated with the first application fabric; and
   reporting data indicating performance of the first application fabric.

4. The method of claim 1, further comprising:
   monitoring traffic associated with the first application fabric; and
   controlling the first application fabric based on the monitoring, wherein controlling the first application fabric comprises instructing one or more nodes of the first application fabric to perform one or more actions, at least one of the actions selected from a group comprising: reserving a bandwidth resource, implementing a routing decision, and updating a policy.

5. The method of claim 4, wherein the monitoring indicates whether the first application meets a predetermined requirement, wherein the predetermined requirement includes information about at least one of quality of service (QoS), latency, loss, or bandwidth availability for the first application.

6. The method of claim 1, wherein the first profile indicates one or more characteristics associated with the first application, wherein at least one of the characteristics is selected from a group comprising: protocol, port number, and message signature.

7. The method of claim 1, further comprising:
   providing a second profile to the plurality of edge routers of the SD-WAN, wherein the second profile enables the plurality of edge routers to discover which devices of the plurality of devices support a second application;
   receiving, from one or more of the edge routers, information indicating which devices of the plurality of devices support the second application; and
   building a second application fabric based on the information indicating which devices of the plurality of devices support the second application, wherein the second application fabric corresponds to a portion of the SD-WAN fabric operable to communicate messages associated with the second application.

8. A system comprising:
   one or more processors; and
   one or more computer-readable non-transitory storage media coupled to one or more of the one or more processors and comprising instructions operable when executed by one or more of the one or more processors to cause the system to:
   provide a first profile to a plurality of edge routers of a software-defined wide area network (SD-WAN), the plurality of edge routers operable to interface a plurality of devices to the SD-WAN, wherein the first profile enables the plurality of edge routers to discover which devices of the plurality of devices support a first application;
   receive, from one or more of the edge routers, information indicating which devices of the plurality of devices support the first application; and
   build a first application fabric based on the information indicating which devices of the plurality of devices support the first application, wherein the first application fabric corresponds to a portion of the SD-WAN operable to communicate messages associated with the first application.

9. The system of claim 8, wherein the one or more processors are further operable to:
   determine a first policy that is specific to the first application; and
   instruct each of the edge routers that is associated with the first application fabric to apply the first policy to traffic of the first application.

10. The system of claim 8, wherein the one or more processors are further operable to:
    monitor traffic associated with the first application fabric; and
    report data indicating performance of the first application fabric.

11. The system of claim 8, wherein the one or more processors are further operable to:
    monitor traffic associated with the first application fabric; and
    control the first application fabric based on the monitoring, wherein controlling the first application fabric comprises instructing one or more nodes of the first application fabric to perform one or more actions, at least one of the actions selected from a group comprising: reserving a bandwidth resource, implementing a routing decision, and updating a policy.

12. The system of claim 11, wherein the monitoring indicates whether the first application meets a predetermined requirement, wherein the predetermined requirement includes information about at least one of quality of service (QoS), latency, loss, or bandwidth availability for the first application.

13. The system of claim 8, wherein the first profile indicates one or more characteristics associated with the first application, wherein at least one of the characteristics is selected from a group comprising: protocol, port number, and message signature.

14. The system of claim 8, wherein the one or more processors are further operable to:
provide a second profile to the plurality of edge routers of the SD-WAN, wherein the second profile enables the plurality of edge routers to discover which devices of the plurality of devices support a second application;
receive, from one or more of the edge routers, information indicating which devices of the plurality of devices support the second application; and
build a second application fabric based on the information indicating which devices of the plurality of devices support the second application, wherein the second application fabric corresponds to a portion of the SD-WAN fabric operable to communicate messages associated with the second application.

15. One or more computer-readable non-transitory storage media embodying software that is operable when executed to:
provide a first profile to a plurality of edge routers of a software-defined wide area network (SD-WAN) that interface a plurality of devices to the SD-WAN, wherein the first profile enables the plurality of edge routers to discover which devices of the plurality of devices support a first application;
receive, from one or more of the edge routers, information indicating which devices of the plurality of devices support the first application; and
build a first application fabric based on the information indicating which devices of the plurality of devices support the first application, wherein the first application fabric corresponds to a portion of the SD-WAN operable to communicate messages associated with the first application.

16. The media of claim 15, wherein the software is further operable to:
determine a first policy that is specific to the first application; and
instruct each of the edge routers that is associated with the first application fabric to apply the first policy to traffic of the first application.

17. The media of claim 15, wherein the software is further operable to:
monitor traffic associated with the first application fabric; and
report data indicating performance of the first application fabric.

18. The media of claim 15, wherein the software is further operable to:
monitor traffic associated with the first application fabric; and
control the first application fabric based on the monitoring, wherein controlling the first application fabric comprises instructing one or more nodes of the first application fabric to perform one or more actions, at least one of the actions selected from a group comprising: reserving a bandwidth resource, implementing a routing decision, and updating a policy.

19. The media of claim 15, wherein the first profile indicates one or more characteristics associated with the first application, wherein at least one of the characteristics is selected from a group comprising: protocol, port number, and message signature.

20. The media of claim 15, wherein the software is further operable to:
provide a second profile to the plurality of edge routers of the SD-WAN, wherein the second profile enables the plurality of edge routers to discover which devices of the plurality of devices support a second application;
receive, from one or more of the edge routers, information indicating which devices of the plurality of devices support the second application; and
build a second application fabric based on the information indicating which devices of the plurality of devices support the second application, wherein the second application fabric corresponds to a portion of the SD-WAN fabric operable to communicate messages associated with the second application.

* * * * *